(12) United States Patent
Elliott (10) Patent No.: US 8,246,408 B2
(45) Date of Patent: Aug. 21, 2012

(54) COLOR CALIBRATION SYSTEM FOR A VIDEO DISPLAY

(75) Inventor: Grant Arthur John Elliott, Tai Po (HK)

(73) Assignee: Barco, Inc., Duluth, GA (US)

( * ) Notice: Subject to any disclaimer, the term of this patent is extended or adjusted under 35 U.S.C. 154(b) by 251 days.

(21) Appl. No.: 12/484,201

(22) Filed: Jun. 13, 2009

(65) Prior Publication Data

US 2009/0311939 A1    Dec. 17, 2009

Related U.S. Application Data

(60) Provisional application No. 61/061,338, filed on Jun. 13, 2008, provisional application No. 61/061,347, filed on Jun. 13, 2008, provisional application No. 61/061,353, filed on Jun. 13, 2008, provisional application No. 61/061,358, filed on Jun. 13, 2008, provisional application No. 61/061,365, filed on Jun. 13, 2008, provisional application No. 61/061,369, filed on Jun. 13, 2008.

(51) Int. Cl.
  *G09G 3/30* (2006.01)

(52) U.S. Cl. ............ 445/3; 345/83; 345/77; 345/76

(58) Field of Classification Search ... 445/3; 345/76–83
See application file for complete search history.

(56) References Cited

U.S. PATENT DOCUMENTS

| 6,314,669 | B1 | 11/2001 | Tucker |
| 6,388,648 | B1 | 5/2002 | Clifton et al. |
| 6,704,989 | B1 | 3/2004 | Lutz et al. |
| 6,813,853 | B1 | 11/2004 | Tucker |
| 2003/0016198 | A1 * | 1/2003 | Nagai et al. ............ 345/83 |
| 2006/0227085 | A1 | 10/2006 | Boldt, Jr. et al. |
| 2007/0120496 | A1 | 5/2007 | Shimizu et al. |

FOREIGN PATENT DOCUMENTS

KR  10-2001-0102377 A   11/2001

* cited by examiner

*Primary Examiner* — Mariceli Santiago
(74) *Attorney, Agent, or Firm* — Aka Chan LLP (57) ABSTRACT

Large digital displays for entertainment, architectural and advertising displays have interconnected display panels with pluralities of light emitting elements. To solve calibration problems, each of the display panels stores measured luminance and chromaticity data for each of the light emitting elements of the panel. The luminance data is independent of the chromaticity data. A central controller can then perform calibration procedures so that the light emitting elements are matched across the entire display.

20 Claims, 4 Drawing Sheets

Figure 6

COLOR CALIBRATION SYSTEM FOR A VIDEO DISPLAY

CROSS-REFERENCE TO RELATED APPLICATIONS

This patent application claims the benefit of U.S. provisional patent applications 61/061,338; 61/061,347; 61/061,353; 61/061,358; 61/061,365; and 61/061,369, all filed Jun. 13, 2008, which are incorporated by reference along with all other references cited in this application.

BACKGROUND OF THE INVENTION

This patent generally relates to displays and particularly to large display systems comprising groups of light emitting elements. The invention discloses improvements in the calibration of the light emitting elements.

Large display systems for entertainment, architectural, and advertising purposes have commonly been constructed of numbers of light emitting elements, such as LEDs or incandescent lamps mounted onto flat tiles. The light emitting elements can be selectively turned on and off to create patterns, graphics and video displays for both informational and aesthetic purposes. It is well known to construct these displays as tiles or large panels which are assembled in position, such as on a stage, for a specific entertainment show or event, or as an architectural or advertising display, such on the tops and sides of buildings.

Many of these systems require large numbers of light emitting elements or pixels acting independently and thus require robust high speed data distribution systems, often driven by computer derived data or video signals.

A requirement of such displays is that the light emitting elements for all pixels on the display be matched within a reasonable tolerance for color and luminance intensity. For example, in a large display comprising many thousands of pixels, each of which may include at least a red, green, and blue LED, an object should appear the same color and brightness wherever it is on the display. Light emitting elements, such as LEDs and their associated drive circuitry, are not manufactured to a close enough tolerance to allow their use uncalibrated in such displays. Although the manufacturers of LEDs sort their production into bins by nominal intensity and color, the tolerance of these bins are not good enough for this demanding application. It is therefore advantageous to adjust or calibrate the output of every LED individually so that an even and cohesive display is produced. Conventional display calibration techniques utilizing calorimeters and luminance meters can be prohibitively expensive and time consuming when applied to a large display having very large numbers of pixels. Such procedures typically use stored CIE chromaticity coordinates and luminance information to calculate the transformation matrices for color calibration. However, such techniques do not allow the display to be operated at different color standards without recalibration, nor do they allow for the differences in photopic (day-time) and scotopic (night-time) vision.

The invention seeks to solve these problems and discloses improvements in the measurement, characterization, and calibration systems for a display comprising groups of light emitting elements so as to provide improved accuracy and flexibility of such calibration across any color space.

BRIEF SUMMARY OF THE INVENTION

The invention provides for a method of calibrating a large display having a plurality of display panels, each display panel having a plurality of light emitting elements. The method includes: measuring the luminance and chromaticity of each of the plurality of light emitting elements to obtain measured luminance and chromaticity data for each of the plurality of light emitting elements, the luminance data independent of the chromaticity data; and storing the measured luminance and chromaticity data with the corresponding display panel. The method further comprises performing a calibration procedure over the entire large display with the stored luminance and chromaticity data for the corresponding light emitting elements. The method also comprises: remeasuring only the luminance of at least one of the plurality of light emitting element in-situ; and performing a recalibration procedure over the entire large display in-situ responsive to the remeasured luminance data.

The disclosed invention also provides for a large digital display which comprises: a plurality of display panels; each display panel having a plurality of light emitting elements and a memory storing luminance and chromaticity data for each of the light emitting elements, the luminance data independent of the chromaticity data; and a central controller connected to each of the display panels, the central controller performing a calibration procedure over the entire large display with the luminance and chromaticity data for each of the light emitting elements.

Other objects, features, and advantages of the present invention will become apparent upon consideration of the following detailed description and the accompanying drawings, in which like reference designations represent like features throughout the figures.

DETAILED DESCRIPTION OF THE INVENTION

To calibrate prior art display systems comprising groups of light emitting elements, such as light emitting diodes (LEDs), prior practice has been to store values of the Commission Internationale de L'Eclairage (CIE) chromaticity coordinates (x, y) for photopic vision and luminance for each pixel to calculate transformation matrices for color calibration. However, using the CIE chromaticity coordinates ties the display to a specific color space and standard, thereby precluding any operation with alternate color spaces or in the scotopic vision color space. In other words, the prior art systems use stored values which already include correction factors or coefficients which limited the calibration of the light emitting elements to certain color spaces and standards.

In contrast, the system disclosed herein stores luminance and chromaticity data for each of the light emitting elements with the display panels to which the elements belong. From the stored normalized power spectral density function (NPSD) for each light emitting element, calibration matrices are dynamically derived for the color space required. Advantageously, this methodology allows the disclosed system to compensate for the differences in photopic (day-time) and scotopic (night-time) vision, as well as the implementation of other color spaces. The disclosed system allows for separate luminance measurement and calibration of a display in the field. The luminance, or brightness, of the light emitting elements used in such displays varies with age and use, while the chromaticity remains comparatively constant. Thus, it is important to be able to adjust the luminance calibration separately from the chromaticity as the display gets older. The disclosed system stores data for luminance and chromaticity separately so that an in-field luminance only calibration system may be used to maintain screen uniformity over the lifetime of the product. Because luminance calibration is easier to perform than chromaticity calibration, this significantly reduces the complexity of in-situ calibration without compromising the accuracy of such calibrations.

Measuring Chromaticity

Accurately measuring the chromaticity of a light emitting element requires a full spectral measurement of the element and is typically performed under controlled conditions. Because only color information is required at this stage, and not luminance, only the NPSD is measured, which may then be adjusted for luminance at a later time. This substantially simplifies the measurement procedure.

Figure 1:
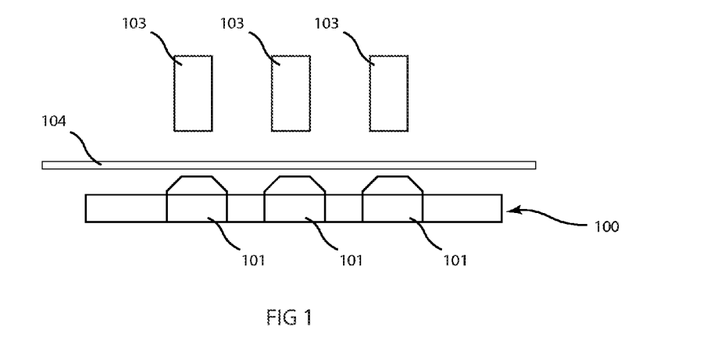
FIG. 1 is an illustration of an embodiment of the present patent showing an LED spectral measurement system.

FIG. 1 an illustration of an embodiment of the present patent showing a light emitting element spectral measurement system. In this description, the light emitting elements 101 of a display panel 100 are LEDs. Each of the LEDs 101 of the display panel 100 may be measured using diffraction grating spectrometers 103, such as the USB4000 manufactured by Ocean Optics, Inc. of Dunedin, Fla. If necessary, the light from each of the LEDs 101 may be passed through a diffusing element 104 to homogenize the light output from each pixel. The spectrometers 103 accept input from a fiber optic channel, which attaches to an optical element to aid measurements, such as a collimating lens, or cosine-correcting lens. A number of measuring heads of the spectrometers 103 may be mounted on a moving head. The heads are positioned above each LED, allowing measurement of each of the LEDs spectral characteristics. Following successful measurement, the head may be moved to the next bank of LEDs until all LEDs are measured. Note that as NPSD is being measured, very accurate control of the distance of the measurement optical elements from the LEDs is not critical. However, controlling the signal-to-noise ratio (SNR) and ensuring that the spectrometer does not limit may be important.

The speed of this measurement process may be determined by:

1. the number of measurements that can be taken simultaneously;
2. the speed of measurement;
3. the time it takes to move the head;
4. the number of LEDs to be calibrated at one time; and
5. the time it takes to upload the coefficients into the tile.

These parameters may be optimized to achieve a satisfactory cycle time. Further improvement in measurement time may also be achieved by adding additional spectrometers.

Figure 2:
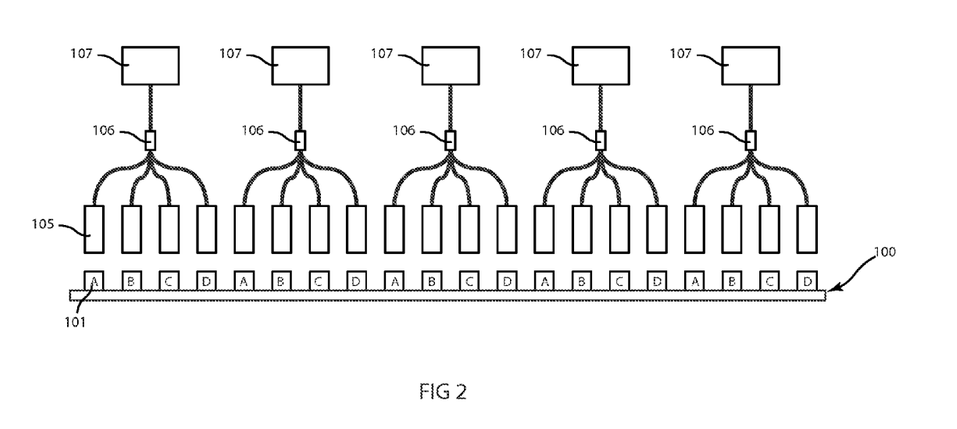
FIG. 2 is a further illustration of an embodiment of the present patent showing an LED spectral measurement system.

FIG. 2 is a further illustration of an embodiment of the present patent showing an LED spectral measurement system utilizing multiple spectrometers. Optical receptors 105, each of which utilizes an optical element such as a collimating lens or cosine corrected lens, are located above each of the LEDs 101 of the display panel 100. A number of these receptors (four are illustrated here, although the patent is not so limited) connect together via a fiber optic splice 106 that sums the light from each connected receptor 105 and transmits the result to a spectrometer 107. As illustrated, five spectrometers would allow measurement of 20 LEDs. Illuminating only one LED per splice unit (denoted A, B, C, and D in FIG. 2) at a time, allows five simultaneous readings to be taken. Four readings, one for each of the A, B, C, and D LEDs, will measure the entire array.

Care needs to be taken that the surrounding environment does not significantly contribute to the measurement, and that neighboring LEDs do not interfere with each other. Interference of neighboring LEDs may be controlled, for example, through careful lens selection or through the use of optical baffles. The fiber diameter and measurement distance each may need to be chosen to minimize the exposure time required to measure each LED while preventing saturation of the spectrometer and maintaining an acceptable signal-to-noise ratio. Preferably, the LEDs are set to 100 percent on during this measurement, i.e. no pulsing associated with PWM signals. Because the linear CCD detector within the spectrometer is progressively scanned, an LED fed with a pulsed signal may result in a missing reading, which will be manifested as a hole in the spectrum. If pulsing an LED is required, then the missing data may be compensated for by software through detection of any faults and interpolation and by multiple scans.

Figure 3:
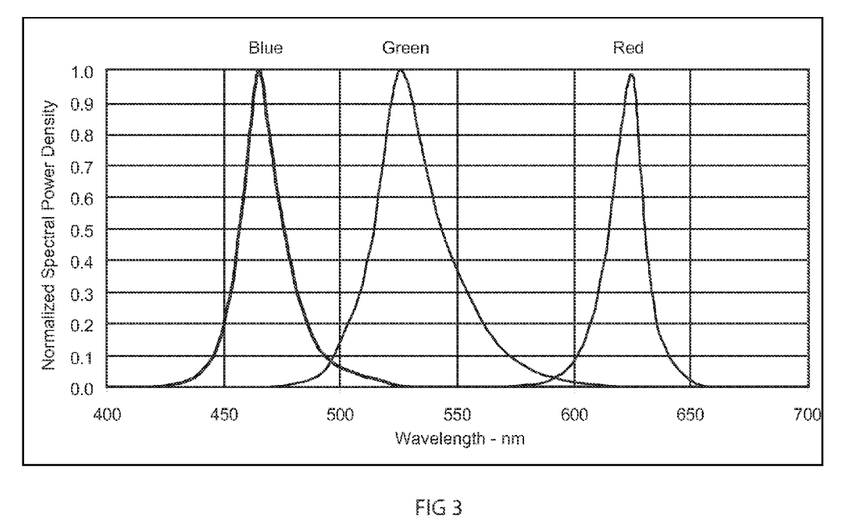
FIG. 3 is an illustration of typical normalized power spectral density (NPSD) functions of red, green, and blue LEDs.

FIG. 3 is an illustration of the typical NPSD function of red, green, and blue LEDs that are commonly utilized in video displays. As can be seen in FIG. 3, the red and blue power spectral density (PSD) functions are narrow and do not overlap. Thus, the red and blue LEDs may be measured simultaneously, thereby reducing the number of measurements required by 33 percent. As the green PSD function overlaps the blue and red, it may be preferable to measure it separately. However, to further reduce the measurement time, all three colors may be measured simultaneously by interpolating the spectra where the green LED spectrum overlaps the red and blue LED spectra.

While PSD functions accurately represent the power (radiance) components of the light being emitted, they do not provide a simple way for mathematically quantifying a color or the way a human perceives a color. The science of the relationship between PSD and perceived color is referred to as colorimetry. In 1931, the CIE developed a standard set of three color-matching functions for describing color as perceived by a Standard Observer, and this system has been internationally adopted as a standard method of color definition for luminous and source displays (i.e. not influenced by an alternative PSD such as reflective display).

Figure 4:
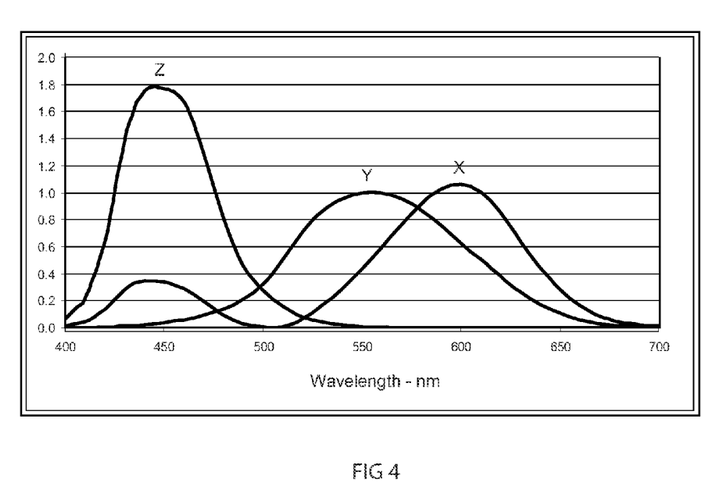
FIG. 4 is an illustration of the CIE X, Y, and Z color matching functions.

The CIE system consists of a luminance component ($\bar{y}$) and two additional color or chromaticity components ($\bar{x}$ and $\bar{z}$). The three components are based upon a series of experiments, and the result is that a color can be expressed in three tristimulus values. FIG. 4 shows the standard color matching functions.

From the PSD of a given color, the CIE X, Y and Z tristimulus values may be determined by correlating the PSD with each of the corresponding color matching functions as shown below.

$$\begin{vmatrix} X \\ Y \\ Z \end{vmatrix} = |\bar{x} \; \bar{y} \; \bar{z}|^T \cdot |PSD|$$

where: $\bar{x}$, $\bar{y}$ and $\bar{z}$ are 1×n matrices representing the color functions (n is typically 3) and PSD is a n×1 matrix representing the PSD of the color.

Note that X, Y and Z take into account brightness or luminance. In terms of perception of color independent of brightness, the CIE proposed a method of normalizing the XYZ tristimulus values to obtain two chromaticity values or coordinates with x and y determined as follows:

$$x = \frac{X}{X+Y+Z}$$
$$y = \frac{Y}{X+Y+Z}$$

These coordinates form the basis of the standard CIE 1931 color diagram and are used in prior display systems for calibration. The CIE values include correction factors or coefficients.

For more sophisticated color processing, it is preferable to store the NPSD data in the product and determine the appropriate CIE tristimulus values within the fixture or controller. This technique allows using other color matching functions such as the CIE 1964 10 degree observer functions (proposed to be more accurate in low ambient light conditions), CIE 1960, CIE 1976 functions or any other color spaces known in the art.

If only CIE x, y, and z are required, then only x and y need to be stored, because z (required to form the complete matrix) can be easily determined from the relationship z=1.0−x−y. Note that as we are ultimately only interested in determining x and y, normalized PSD functions can be measured so the repeatability of luminance measurement in this process is not of concern.

For some LEDs, the PSD may be highly dependent upon drive current, for example, with Nichia Green LEDs. The PSD may also be slightly influenced, but this influence is largely overshadowed by the high dependence of luminance on junction temperature, and thus ambient temperature and drive current. This must be taken into account when determining the operating current of the LEDs, as changing this later on in the life of the product will require complete recalibration of both chromaticity and color.

Measuring Luminance

Figure 5:
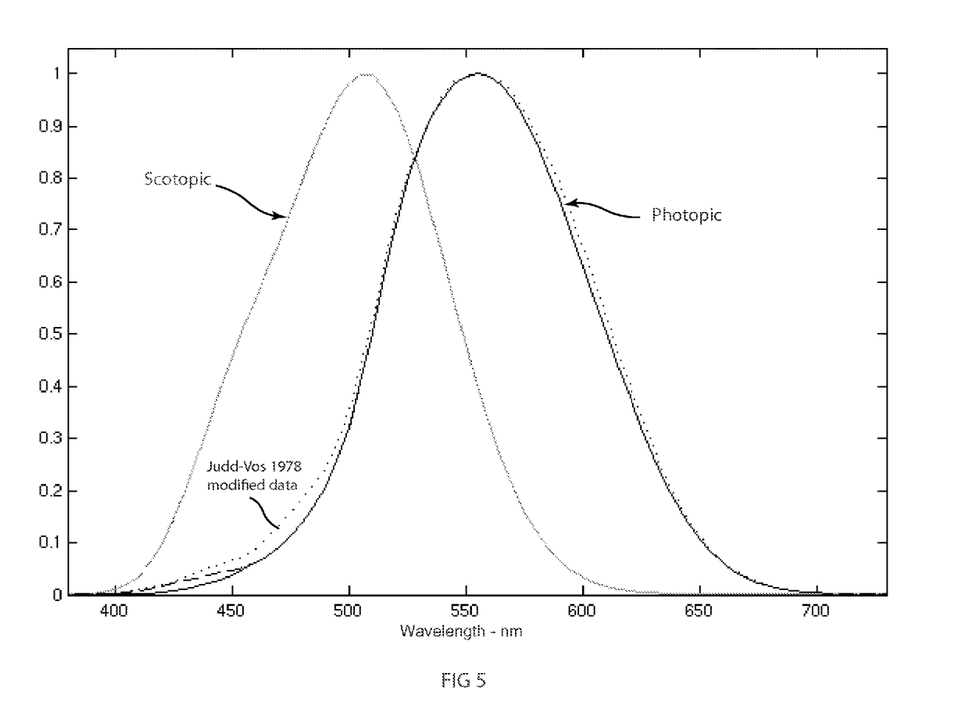
FIG. 5 is an illustration of the photopic and scotopic luminosity functions.

Luminance is a photometric unit, as opposed to a radiometric one, based on the statistical response of the human eye that provides a measure of perceived brightness. Luminance has a unit of candela per square meter. The candela is an SI unit and is the measurement unit for luminous intensity, which is defined as the power emitted by a light source in a particular direction spectrally weighted by a luminosity function that is modeled on the spectral response of the human eye. The CIE 1931 specification includes a series of standard observer luminosity functions for photopic (the response during daylight hours centered around 555 nanometers) and scotopic vision (the response during night hours centered around 505 nanometers). These luminosity functions are illustrated in FIG. 5. Note the similarity between the photopic curve in FIG. 5 and the CIE tristimulus function for luminance (Y).

Substantial care should be taken when measuring absolute luminance, particularly regarding calibration of the measurement unit and ambient light conditions. It is much easier to determine relative luminance, particularly if the ambient conditions can be controlled.

Within a batch of LEDs, it is possible for a 1:1.4 ratio between the most and least bright LEDs. This means that the least bright LED could be 71 percent of the luminance of the brightest LED. Thus, accurate determination of luminance is critical to maintaining uniformity.

Additionally, the luminance of an LED degrades with temperature and time, so while the PSD or color of the LED might not change much over the LED's life, the brightness does, and this degradation is the primary source of uniformity degradation in LED displays. Uniformity degradation may appear as if the color is changing, particularly with white, where all LEDs are illuminated. However, this degradation is almost entirely due to the varying luminance levels for each primary changing independently, changing the color mix. Typically, Green and Blue degrade substantially more than Red.

The disclosed calibration system uses a two stage process for measuring luminance; first a CCD based imaging system is used to determine the relative luminance between each LED for each color, and then a standard luminance meter is used to determine the average absolute luminance for the panel. The two measurements may then be combined to obtain absolute luminance readings for each color, for each pixel. Though a CCD based system can be calibrated, the system may drift over time and the calibrated reference point is needed to correct this drift.

Control of the ambient temperature and ambient lighting conditions are critical for ensuring repeatability for luminance measurement. Additionally, the thermal time constant of the display must be determined experimentally. The thermal time constant is the time required for a display panel to reach steady state luminance readings for red, green, and blue when operating at the chosen calibration temperature. The display panels need to be stored for a sufficient period of time at the calibration temperature, and then each display panel must be run for an identical period of time before measurements are taken.

The calibration system has ambient temperature measurement capability and will only calibrate when the environment is within specification. A suitable calibration temperature may be, for example, 20 degrees C±1 degree C.

Parameters that require strict control when measuring luminance may include but not be limited to:
 1. Ambient temperature
 2. Warm up time
 3. Measurement distance (for both the CCD and luminance meter)
 4. Lens parameters such as aperture, focal length
 5. Exposure/measurement time
 6. Relative humidity
 7. Ambient light conditions
 8. Light reflections (can be controlled through the use of optical baffles.)
 9. Regular calibration for all equipment
 10. Regular verification of the system through the use of standard modules with known calibration The more controlled the environment and the process, the more accurate and repeatable the calibration will be. Appropriate checks and balances need to be incorporated into the calibration process to ensure that these ambient conditions are not only within specification, but also logged for future diagnostic purposes.

But even with the cautionary notes above, the measurement of, and proper calibration for, the luminance of the LEDs of the display panels is relatively easy and can be done in-situ, i.e., at the installed display. On the other hand, properly measuring the chromaticity of the LEDs in-situ is very difficult given the difficulty in measurement under controlled conditions.

Storage on Display Panels

Figure 6:
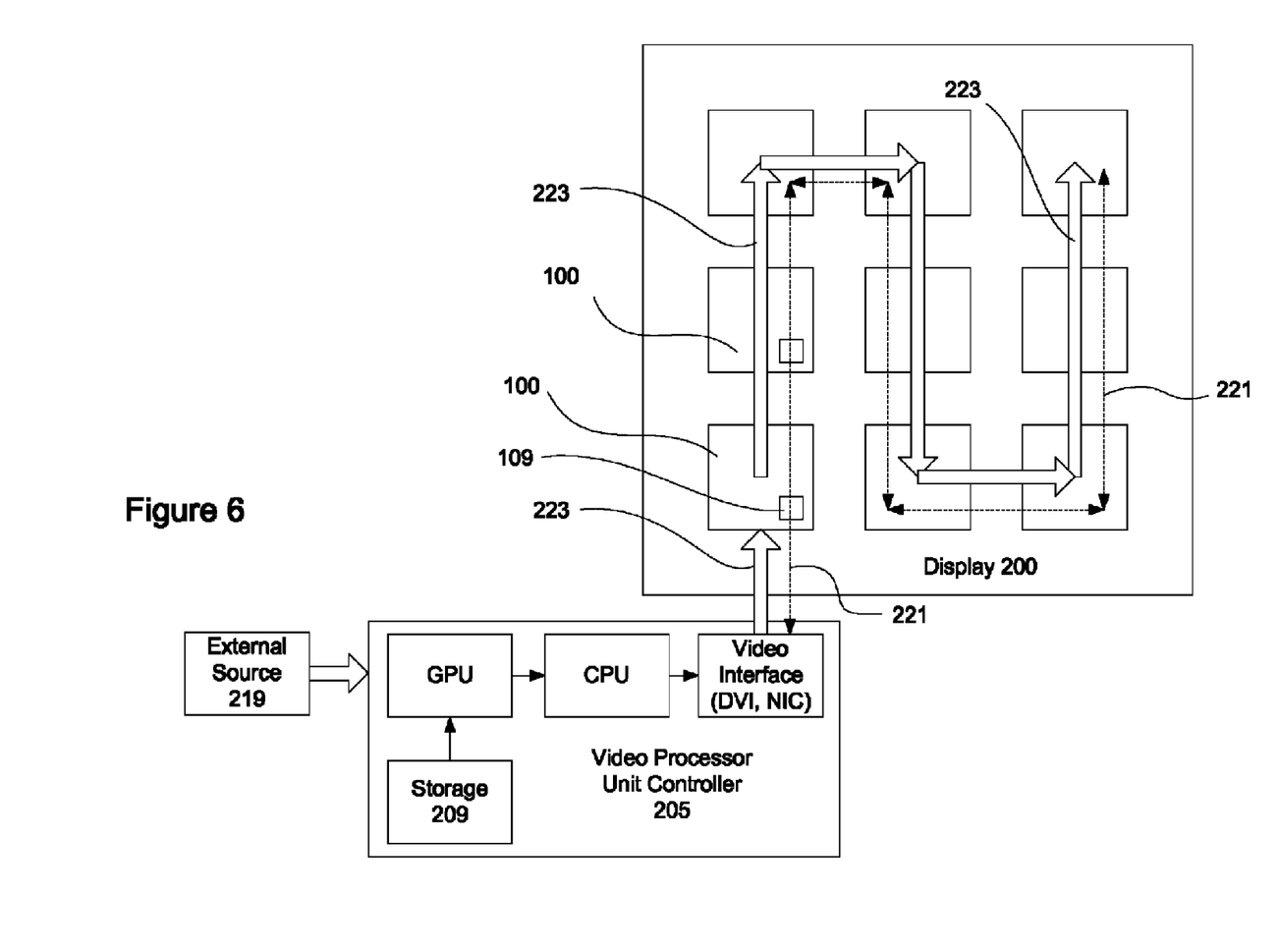
FIG. 6 is a representation of a display and its constituent display panels, according to one embodiment of the present invention.

Once all measurements have been taken for the LEDs of a display panel, the luminance and chromaticity data are stored on the display panel. FIG. 6 form an overall display 200 formed by a plurality of display panels 100 arrayed in tiles of rows and columns. In this representation only nine display panels 100 are shown and are separated to better illustrate their organization. Graphic or video information for each of the light emitting elements 101 of each display panel 100 to display is passed from a central video processor unit controller 205 over a data bus 223 which interconnects the display panels 100 and connects them to the controller 205. The controller 205 can receive display information as represented by an external source 219. To process the information for display by each display panel 100 and its constituent light emitting elements 101, the central controller 205 has a graphics processor unit (GPU), a central processing unit (CPU), network interface card (NIC) and memory storage 209, and the high-speed data bus 223 carries the display information to the display panels 100. Although a NIC is depicted, the video processor may be connected by any output means to the display panels, including, for example, video transport (e.g., DVI, HDMI, VGA, or other).

Each display panel 100 also has a memory unit 109 which holds the measured luminance and chromaticity data described for each light emitting element so that the element remains properly calibrated. Memory units 109 for only two display panels 100 are shown for drawing simplicity. Preferably the memory units 109 are based on nonvolatile memory, such as EEPROM integrated circuits, so that the stored data is not lost when power is cut to the display panels. The video processor unit controller 205 also performs the calibration and recalibration procedures described below. A second bus 221, shown by a dotted line, interconnects the display panels 100 and connects them with the controller 205. As shown by the double-headed arrow, the panels 100 can pass their luminance and chromaticity data to the controller 205 for processing and once processed, the controller 205 can send the data back to the control panels 100 for storage. It should be understood that accompanying the luminance and chromaticity data there is information to identify the display panel and constituent light emitting element to which the data refers. With this arrangement the central controller 205 can perform the calibration and recalibration procedures so that the individual light emitting elements are matched over the entire display. This contrasts with less desirable calibration (and recalibration) procedures by which the elements are matched over a display panel.

More details on a display system are described in U.S. patent application Ser. Nos. 12/415,627, filed Mar. 31, 2009, Ser. No. 12/484,200, filed Jun. 13, 2009, and U.S. provisional patent applications 61/072,597, filed Mar. 31, 2008, and 61/170,887, filed Apr. 20, 2009, which are incorporated by reference.

Calibration and Recalibration: Determination of the TRA Matrix for Each Pixel

The measured chromaticity and luminance data of each light emitting element is used to calculate the calibration values for the element. Some prior art products simply calculate a transformation matrix (TRA) based upon the color and luminance measurements and a predetermined destination color space (such as PAL or NTSC). However, to recalibrate luminance in the future, both parameters may need to be stored separately, because when combined into a TRA, luminance and chromaticity cannot be independently extracted.

Notwithstanding the above, it may be advantageous to additionally store the CIE x, y chromaticity coordinates as well as luminous intensity for each LED in the memory unit 109 for each display panel 100, as shown in FIG. 6. As discussed above, because x+y+z=1.0, it is only necessary to store x and y. Thus, an example matrix stored in the EEPROM follows:

$$\begin{vmatrix} x_R & x_G & x_B \\ y_R & y_G & y_B \\ I_R & I_G & I_B \end{vmatrix}$$

The method described below for determining the transformation matrix is based almost entirely on SMPTE Recommended Practice 177-1993 entitled "Derivation of Basic Color Television Equations." In order to assist with understanding, the appropriate section of that document is referenced in square brackets.

Form source (target matrix) (P). In the SMPTE Recommended Practice "source" refers to the source color space, but in this case this is the target color space. In order to duplicate the same color space as the source (e.g. PAL), the PAL color space would be the target color space. However, to exploit the extended color gamut it may be necessary to adjust these coordinates. Adjustments will provide a display with more vibrant, but less accurate colors. For decorative applications of video display products, it is generally preferable to exploit maximum color gamut.

The required color space may be selected in a control system, and this information is sent to the display to calculate the TRA. Including this selection may allow the user to determine if they prefer accuracy or vibrancy.

The source color space is defined as:
Red ($x_{SR}$, $y_{SR}$) e.g. (0.64, 0.3) for PAL Red
Green ($x_{SG}$, $y_{SG}$) e.g. (0.3, 0.6) for PAL Green
Blue ($x_{SB}$, $y_{SB}$) e.g. (0.15, 0.06) for PAL Blue
Additionally, the source white point ($x_W$, $y_W$), needs to be defined. A common white point is D65 which is the standard for television transmission (0.3127, 0.329).

$$P_S = \begin{vmatrix} x_{SR} & x_{SG} & x_{SB} \\ y_{SR} & y_{SG} & y_{SB} \\ z_{SR} & z_{SG} & z_{SB} \end{vmatrix} \text{ and } W = \begin{vmatrix} x_w/y_w \\ 1.0 \\ z_w/y_w \end{vmatrix}$$

Note here that each coordinate for the W matrix is normalized with respect to $y_W$ (luminance) so that white luminance as a value of 1.0 (i.e. R=G=B=1 for white).

Compute the coefficient matrix. These coefficients effectively determine the relative gain required from each of the primaries such that R=G=B=1 produces white.

$$\begin{vmatrix} C_{SR} \\ C_{SG} \\ C_{SB} \end{vmatrix} = P_S^{-1} \cdot W$$

Form the diagonal matrix $C_S$ as follows:

$$C_S = \begin{vmatrix} C_{SR} & 0 & 0 \\ 0 & C_{SG} & 0 \\ 0 & 0 & C_{SB} \end{vmatrix}$$

Compute the final source normalized primary matrix $NPM_S$ as the product of Ps and Cs:

$$NPM_S = \begin{vmatrix} X_{SR} & X_{SG} & X_{SB} \\ Y_{SR} & Y_{SG} & Y_{SB} \\ Z_{SR} & Z_{SG} & Z_{SB} \end{vmatrix} = P_S \cdot C_S$$

This finally relates the linear RGB values from the video signal to CIE X, Y, Z tristimulus as:

$$\begin{vmatrix} X \\ Y \\ Z \end{vmatrix} = \begin{vmatrix} X_{SR} & X_{SG} & X_{SB} \\ Y_{SR} & Y_{SG} & Y_{SB} \\ Z_{SR} & Z_{SG} & ZS_B \end{vmatrix} \cdot \begin{vmatrix} R_S \\ G_S \\ B_S \end{vmatrix}$$

Note that for the $NPM_S$, $Y_{SR}+Y_{SG}+Y_{SB}=1.0$, so the ratios of $Y_{SR}$, $Y_{SG}$ and $Y_{SB}$ represent the ratios of red, green, and blue that are required to get the designated white point. For example, for PAL, these ratios are: Red 21 percent, Green 72 percent and Blue 7 percent.

Form destination (LED display) primary matrix (P). The same process is repeated to determine the destination normalized primary matrix ($NPM_D$), which may be based upon the chromaticity coordinates obtained in the calibration process.

$$\begin{vmatrix} C_{DR} \\ C_{DG} \\ C_{DB} \end{vmatrix} = P_D^{-1} \cdot W$$

$$P_D = \begin{vmatrix} x_R & x_G & x_B \\ y_R & y_G & y_B \\ (1-x_R-y_R) & (1-x_G-y_G) & (1-x_B-y_B) \end{vmatrix}$$

and $W = \begin{vmatrix} x_w/y_w \\ 1.0 \\ z_w/y_w \end{vmatrix}$ $$C_D = \begin{vmatrix} C_{DR} & 0 & 0 \\ 0 & C_{DG} & 0 \\ 0 & 0 & C_{DB} \end{vmatrix}$$

$$NPM_D = \begin{vmatrix} X_{DR} & X_{DG} & X_{DB} \\ Y_{DR} & Y_{DG} & Y_{DB} \\ Z_{DR} & Z_{DG} & Z_{DB} \end{vmatrix} = P_D \cdot C_D$$

This allows the determination of tristimulus values for a destination RGB color:

$$\begin{vmatrix} X \\ Y \\ Z \end{vmatrix} = NPM_D \cdot \begin{vmatrix} R_D \\ G_D \\ B_D \end{vmatrix} = \begin{vmatrix} X_{DR} & X_{DG} & X_{DB} \\ Y_{DR} & Y_{DG} & Y_{DB} \\ Z_{DR} & Z_{DG} & Z_{D_B} \end{vmatrix} \cdot \begin{vmatrix} R_D \\ G_D \\ B_D \end{vmatrix}$$

Thus, it is possible to determine the RGB values required to reproduce a given set of tristimulus values:

$$\begin{vmatrix} R_D \\ G_D \\ B_D \end{vmatrix} = NPM_D^{-1} \cdot \begin{vmatrix} X \\ Y \\ Z \end{vmatrix} = \begin{vmatrix} X_{DR} & X_{DG} & X_{DB} \\ Y_{DR} & Y_{DG} & Y_{DB} \\ Z_{DR} & Z_{DG} & Z_{D_B} \end{vmatrix}^{-1} \cdot \begin{vmatrix} X \\ Y \\ Z \end{vmatrix}$$

Consequently, it is possible to determine the RGB values required for the target color space to reproduce the color of the source RGB color space, and, in turn, determine the transformation matrix.

$$\begin{vmatrix} R_D \\ G_D \\ B_D \end{vmatrix} = NPM_D^{-1} \cdot \begin{vmatrix} X \\ Y \\ Z \end{vmatrix} = NPM_D^{-1} \cdot NPM_S \cdot \begin{vmatrix} R_S \\ G_S \\ B_S \end{vmatrix} = TRA \cdot \begin{vmatrix} R_S \\ G_S \\ B_S \end{vmatrix}$$

Thus:

$$TRA = NPM_D^{-1} \bullet NPM_S$$

Note that if any term in the TRA is negative, then the target on source color space cannot be rendered completely by the display. To maximize accuracy, negative coefficients need to be allowed for and coefficients of less than zero are rounded to zero.

Gain adjust the TRA. The process above works on normalized luminance, so the scale factors on gains must also be applied to each color to get the target luminance. The process also assumes that red, green, and blue are adjusted so when set to 100 percent, they combine to form the white point, at the target luminance.

Assume, for example, a target luminance is $L_W$ is 5000 candela per square meter. This luminance may be multiplied by the square area for each pixel to determine a target luminous intensity pen pixel for white (Iw). The luminous intensity for each LED measured at the time of calibration, $I_R$, $I_G$, and $I_B$ is stored in the memory 109 of the corresponding display panel.

The second row of the $NPM_D$ ($Y_{DR}$, $Y_{DG}$ and $Y_{DB}$) determines the ratio of the red, green, and blue LEDs that are required to meet the set white point. For example, for red, $I_W \times Y_{DR}$ determines the luminous intensity required of the red LED to meet the red requirement of the white set point, for the given $I_W$.

Thus, the gain adjustments required for each LED, where a gain of 1 gives the required luminous intensity to meet the white point at the specified brightness are:

$$k_R = \frac{I_W \cdot Y_{DR}}{I_R}$$

$$k_G = \frac{I_W \cdot Y_{DG}}{I_G}$$

$$k_B = \frac{I_W \cdot Y_{DB}}{I_B}$$

Note that if any of the gains are greaten than 1.0, then that color cannot be displayed at the requested luminance level.

To determine the PWM values for each of the LEDs in an efficient manner, these gains may be included the TRA.

$$TRA' = \begin{vmatrix} k_R \cdot TRA_{11} & k_R \cdot TRA_{12} & k_R \cdot TRA_{13} \\ k_G \cdot TRA_{21} & k_G \cdot TRA_{22} & k_G \cdot TRA_{23} \\ k_B \cdot TRA_{31} & k_B \cdot TRA_{32} & k_B \cdot TRA_{33} \end{vmatrix}$$

Thus, the PWM values required for the LEDs (range 0.0 to 1.0) are:

$$\begin{vmatrix} PWM_{RED} \\ PWM_{GREEN} \\ PWM_{BLUE} \end{vmatrix} = TRA' \cdot \begin{vmatrix} R_S \\ G_S \\ B_S \end{vmatrix}$$

Note that all these calculations occur in linear space, therefore any gamma correction must be performed following the color space conversion.

Verification of Calibration

Once TRAs have been calculated for each LED, a test may be required to verify the calibration. Measuring the relative luminance at an LED level may be difficult because the PWM is active, and due to the progressive scanning of the CCD, errors may occur. Higher grade, ultra-fast, scientific CCDs can compensate for this effect, as can increasing the exposure time, although due to the high brightness compensation may also be difficult. To truly test accuracy, a high-speed, scientific CCD with x, y and z color filters is required, including, for example, CCDs available from Radiant Imaging, Inc. of Redmond, Wash. on MunaTest. Alternatively, a standard spectroradiometer such as a CS-1000 on SpectraScan may be used to determine panel compliance.

Embodiments disclosed herein may provide for one on more of the following advantages. First, the calibration system disclosed herein may allow for calibration of displays to arbitrary color spaces. The calibration system disclosed herein may also allow for the adjustment of a display to both photopic vision (day) and scotopic vision (night). Furthermore, the calibration system disclosed herein may allow for enhanced screen uniformity across a display as the elements within a display wear. Finally, the calibration system disclosed herein may reduce the complexity of in-field calibrations of displays. The display can be recalibrated by remeasuring the luminance of the light emitting elements only in-situ.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of calibrating a large display having a plurality of display panels, each display panel having a plurality of light emitting elements, the method comprising:
measuring luminance and chromaticity of each of the plurality of light emitting elements to obtain measured luminance and chromaticity data for each of the plurality of light emitting elements, the luminance data independent of the chromaticity data;
storing a first measured luminance and chromaticity data for a first display panel at a first memory unit housed in the first display panel; and
storing a second measured luminance and chromaticity data for a second display panel at a second memory unit housed in the second display panel.

2. The method of claim 1 further comprising:
performing a calibration procedure over the entire large display with the stored luminance and chromaticity data for the corresponding light emitting elements.

3. The method of claim 1 wherein the measuring luminance and chromaticity of each of the plurality of light emitting elements is while the plurality of light emitting elements are in a pulsing mode.

4. The method of claim 1 wherein the measuring luminance and chromaticity of each of the plurality of light emitting elements is while the plurality of light emitting elements are in a non-pulsing mode.

5. The method of claim 1 wherein measuring luminance and chromaticity of each of the plurality of light emitting elements comprises:
measuring the luminance at a first time, and
measuring the chromaticity at a second time, wherein the first and second times are different.

6. The method of claim 1 wherein the display tile comprises a plurality of rows and a plurality of columns of pixels,
each pixel comprising at least four light-emitting diode elements, and
each of the at least four light emitting diode elements of a pixel emits a different light color.

7. The method of claim 6 wherein the each pixel comprising at least four light-emitting diode elements comprises a red, green, blue and cyan light-emitting diode elements.

8. The method of claim 1 wherein the first measured luminance and chromaticity data and the second measured luminance and chromaticity data comprise different values.

9. A method of calibrating a large display having a plurality of display panels, each display panel having a plurality of light emitting elements, the method comprising:
measuring luminance and chromaticity of each of the plurality of light emitting elements to obtain measured luminance and chromaticity data for each of the plurality of light emitting elements;
storing the measured luminance and chromaticity data with the corresponding display panel;
remeasuring the luminance only of at least one of the plurality of light emitting element in-situ; and
performing a recalibration procedure over the entire large display in-situ responsive to the remeasured luminance data.

10. The method of claim 9 wherein the performing the recalibration procedure over the entire large display *in-situ* responsive to the remeasured luminance data comprises using a set of three tristimulus values.

11. The method of claim 10 wherein at least one tristimulus value of the set of three tristimulus values is a measure of luminance only.

12. The method of claim 10 wherein one of the tristimulus value of the set of three tristimulus values is calculated from two of the tristimulus values.

13. The method of claim 9 wherein the measuring luminance and chromaticity of each of the plurality of light emitting elements to obtain measured luminance and chromaticity data for each of the plurality of light emitting elements is at a first time and the remeasuring the luminance only of at least one of the plurality of light emitting element in-situ is at a second time, after the first time.

14. The method of claim 13 wherein the first time is in a controlled environment.

15. The method of claim 9 wherein the remeasuring the luminance only of at least one of the plurality of light emitting element in-situ is without measuring the chromaticity of at least one of the plurality of light emitting elements.

16. A method of calibrating a large display having a plurality of display panels, each display panel having a plurality of light emitting elements, the method comprising:
measuring luminance and chromaticity of each of the plurality of light emitting elements at a first time to obtain measured luminance and chromaticity data for each of the plurality of light emitting elements;
controlling the luminance and chromaticity of a first display panel using a controller; and
controlling the luminance and chromaticity of a second display panel using the controller, wherein the measured luminance and chromaticity data of the second display panel passes through the first display panel to the controller.

17. The method of claim 16 wherein the controller and the first and second display panels are separate.

18. The method of claim 16 further comprising:
storing a first measured luminance and chromaticity data for a first display panel at a first memory unit at the first display panel; and
storing a second measured luminance and chromaticity data for a second display panel at a second memory unit at the second display panel.

19. The method of claim 16 further comprising:
remeasuring luminance of each of the plurality of light emitting elements at a second time to obtain remeasured luminance data for each of the plurality of light emitting elements, wherein the second time is different than the first time;
determining that luminance of one of the plurality of light emitting elements has decreased from the first time; and
controlling the luminance and chromaticity of the first display panel using the controller with the remeasured luminance.

20. The method of claim 16 wherein the stored data at the first and second memory units are different.

* * * * *